United States Patent [19]

Pronovost

[11] 4,323,125
[45] Apr. 6, 1982

[54] ROTARY WEEDING MACHINE

[76] Inventor: Normand Pronovost, 256, Rte. 159, St-Tite, Co. Laviolette, Prov. of Quebec, Canada, G0X 3H0

[21] Appl. No.: 116,240

[22] Filed: Jan. 28, 1980

[51] Int. Cl.³ .................... A01B 33/06; A01B 39/08
[52] U.S. Cl. .................................... 172/59; 172/81; 172/78; 172/125
[58] Field of Search ............... 172/59, 112, 125, 49, 172/81, 47, 78, 72, 509, 184

[56] References Cited

U.S. PATENT DOCUMENTS

| Re. 25,237 | 9/1962 | Heeren | 172/59 |
|---|---|---|---|
| 2,741,173 | 4/1956 | White | 172/59 X |
| 2,792,770 | 5/1957 | Ober | 172/125 |
| 3,667,551 | 6/1972 | Lely | 172/59 |
| 3,765,491 | 10/1973 | Lely | 172/59 |
| 4,046,202 | 9/1977 | Lely | 172/112 |
| 4,121,669 | 10/1978 | Sosalla | 172/509 X |

FOREIGN PATENT DOCUMENTS

| 438418 | 12/1946 | Canada . | |
|---|---|---|---|
| 637940 | 3/1962 | Canada | 172/59 |
| 949374 | 6/1974 | Canada | 172/59 |
| 1024804 | 1/1978 | Canada | 172/59 |
| 1045698 | 12/1958 | Fed. Rep. of Germany | 172/59 |
| 2121868 | 12/1971 | Fed. Rep. of Germany | 172/59 |
| 1534089 | 11/1978 | United Kingdom | 172/59 |

Primary Examiner—Richard J. Johnson

[57] ABSTRACT

A rotary weeding machine for the culture of plants in rows is disclosed. The machine comprises a transverse tool bar adapted to be attached to the regular three-point hitch of a tractor, two wheels mounted one at each end of the tool bar for supporting the bar above the ground, a plurality of vertical shafts mounted for rotation on the tool bar and each supporting a soil-working device adapted to cut the weeds between the rows of plants, a plurality of vertical plates mounted on the tool bar, one on each side of the soil-working devices for preventing earth and weeds displaced by the soil-working devices from being thrown against the plants, and means for coupling the shafts of the soil-working devices to the regular power take-off of the tractor.

1 Claim, 3 Drawing Figures

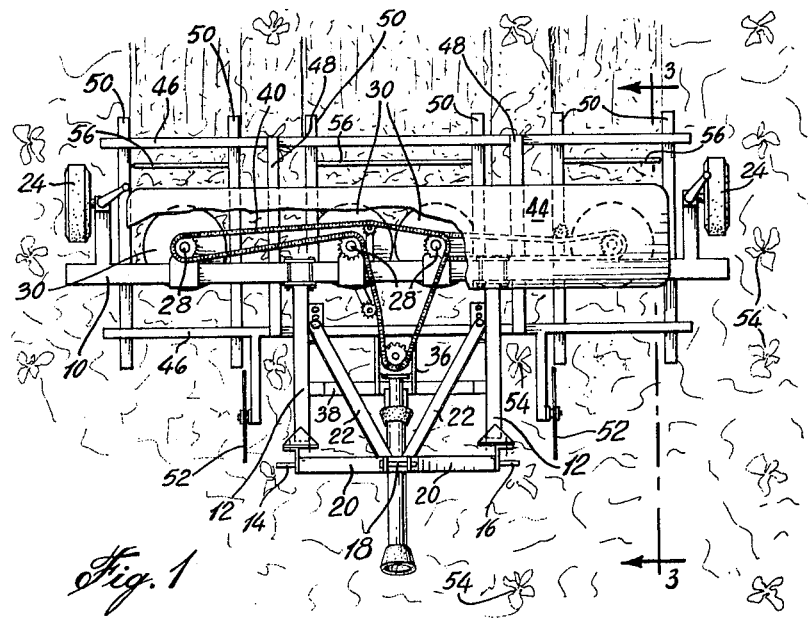
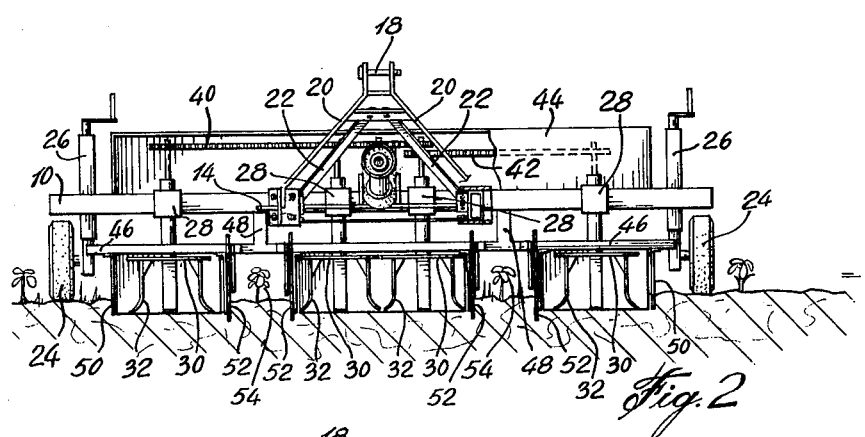
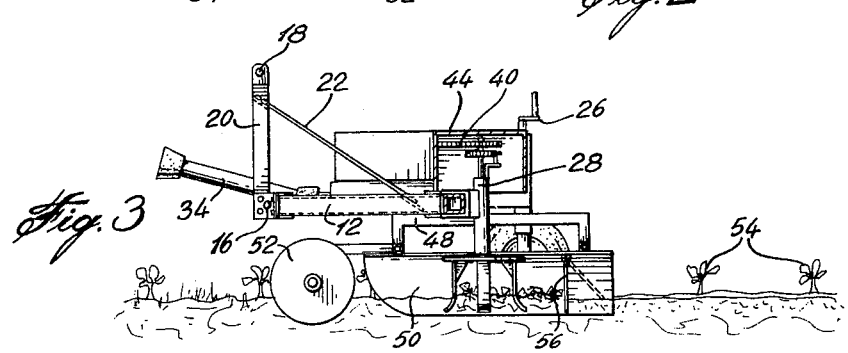

ROTARY WEEDING MACHINE

This invention relates to a rotary weeding machine and, more particularly, to a machine for use in the culture of plants in rows to cut weeds between rows of plants.

Various cultivating implements, adapted to be attached to conventional farm tractors, are known. An example of such devices is the one disclosed in Canadian Pat. No. 949,374, issued June 18, 1974. However, to applicant's knowledge, none of the known machines are readily adaptable to cutting the weeds between adjacent rows of plants without damaging the plants.

It is therefore the object of the present invention to provide a machine for cutting weeds between rows of plants, which does not damage the plants.

It is also a further object of the present invention to provide a weeding machine of simple construction, which may be custom built to suit the needs of each individual user, that is depending on the number of rows of plants it is desired to weed at each pass of the machine and on the space between each row.

The weeding machine in accordance with the invention comprises a transverse tool bar adapted to be attached to the regular three-point hitch of a tractor, two wheels mounted one at each end of the tool bar for supporting the bar above the ground, a plurality of vertical shafts mounted for rotation on the bar and each supporting a soil-working device adapted to cut the weeds between the rows of plants, a plurality of vertical, longitudinal plates mounted on the bar, one on each side of the soil-working devices, for confining earth and weeds displaced by the soil-working devices and thus preventing the same from being thrown against the plants, and means for coupling the shafts of the soil-working devices to the regular power take-off of the tractor.

The length of the tool bar depends on the number of rows of plants intended to be worked by the weeding machine at each pass of the machine end of the space between each row.

A manual jack is preferably provided for adjusting the height of the tool bar with respect to the axis of the wheels, so as to vary the working depth of the soil-working devices.

Each working device preferably comprises a disc attached to the lower end of each shaft and a number of tines extending downwardly from each disc, the lowermost end of each tine being bent over so as to extend at least to a small inclination to the horizontal for cutting the weeds.

The means for coupling the shafts of the soil-working devices to the regular power take-off of the tractor preferably comprises a gear box mounted on the machine and sprocket chains coupling the output of the gear box to such shafts. A housing is preferably mounted on the machine for covering the gear box and the sprocket chains.

A rotary disc is preferably mounted on each side of the rows of plants in line with the vertical plates for cutting of soil ahead of the vertical plates. A transverse plate is also preferably secured between adjacent vertical plates at the back of the soil-working devices for levelling the soil after the passage of the weeding machine.

The invention will now be disclosed, by way of example, with reference to the accompanying drawings, in which:

FIG. 1 illustrates a top plan view of the weeding machine in accordance with the invention;

FIG. 2 illustrates a front elevational view of the machine in accordance with the invention; and FIG. 3 illustrates a view taken along line 3—3 of FIG. 1.

Referring to the drawings, there is shown an embodiment of a weeding machine comprising a transverse tool bar 10, which is attached to the regular three-point hitch of the tractor by means of a special attachment including two longitudinal beams 12 secured at one end to transverse bar 10. The other end of the two longitudinal beams 12 is provided with pins 14 and 16 adapted to be attached to the two lower points of the tractor hitch. The third point of the tractor hitch is adapted to be attached to a pin 18 located at the apex of two triangular coupling members formed by downwardly divergent strips 20 secured to the forward end of longitudinal beams 12 and by rearwardly divergent strips 22 secured to the side of longitudinal beams 12 adjacent the rear thereof.

Tool bar 10 is mounted on two wheels 24 and the height of the bar with respect to the axis of the wheels is adjustable through two manual jacks 26.

A plurality of vertical shafts 28 are mounted on the tool bar 10 and the lower end of each shaft supports a soil-working device including a disc 30, to which are secured a plurality of vertical tines 32, which are bent over, at their lowermost end, to a small inclination to the horizontal for cutting the weeds. The shafts are driven from the regular power take-off of the tractor through shaft 34 and gear box 36, which is mounted on transverse beams 38 secured between longitudinal beams 12. The output of the gear box is coupled to all the shafts 28 through sprocket chains 40 and 42. The gear box and the sprocket chains are covered by housing 44.

Two transverse beams 46 are also secured to the transverse bar 10 by means of longitudinal beams 48. Beams 46 support a plurality of guard plates 50, which are located vertically and longitudinally one on each side of the soil-working devices to prevent earth and weeds which may be projected by the tines of the soil-working devices from coming into contact with the plants. Also mounted on the front transverse beams 46, are a pair of rotary discs 52 which are in the planes of vertical plates 50 for cutting the soil between each row of plants 54. A vertical, transverse plate 56 is provided between each pair of vertical plates 50 at the back of the soil-working devices for levelling the soil worked up by the tines 32.

It is noted that the lower edges of longitudinal plates 50 and of rotary discs 52 are substantially at the same level and slightly lower than the lowermost ends of tines 32. A neat cut is thus obtained in the soil on each side of the rows of plants and the soil between the plant rows is only worked to the depth required for proper weeding without damaging the plant roots.

The above-disclosed weeding machine operates as follows:

The machine is attached to the three-point hitch of a farm tractor and pulled to a field of plants cultivated in rows in a manner such that the soil-working devices pass between the rows of plants. The rotary soil-working devices are rotated by the power take-off of the tractor to cut the weeds. At the same time, the plates at the back of the soil-working devices level the soil behind the machine. It will be noted that the central part of the weeding machine, that is the one equipped with two adjacent soil-working devices, is passed every second row of plants and that each soil-working device located adjacent the wheels of the machine, does only half of the space between the adjacent rows of plants.

It will be seen from the above, that the machine is very versatile. It may be used for the culture of any plants in rows, whatever may be the distance between the rows. Indeed, because the various elements of the machine are detachably and adjustably mounted on a single tool bar by means for instance of U-shaped clamps, they may be spaced as desired, depending on the size of the soil-working devices which, of course, is dependent on the space between the rows of plants. The machine may also be constructed to take as many rows of plants as desired.

Although the invention has been disclosed with reference to a preferred embodiment, it is to be understood that it is not limited to such embodiment and that other alternatives are also envisaged within the spirit and scope of the appended claims.

What I claim is:

1. A rotary weeding machine for removing weeds and working the soil between spaced rows of plants, comprising:

(a) a transverse tool bar adapted to be attached at its central portion to the regular three-point hitch of a tractor end of a length for extending above several rows of plants transverse to the direction of travel;

(b) two ground-engaging wheels mounted one at each end of said tool bar for supporting said tool bar above the ground;

(c) a plurality of vertical shafts mounted for rotation on said tool bar and each supporting a soil-working device adapted to cut the weeds and work the soil between the rows of plants, said soil-working devices arranged to form a central pair of adjacent devices to work the soil between two rows of plants, and two spaced outermost devices arranged to work half the width of the soil on the outside of said two rows of plants;

(d) each soil-working device comprising a disc attached to the lower end of each shaft and a number of tines extending downwardly from each disc, the lowermost end of each tine being bent over so as to extend at least to a small inclination to the horizontal for cutting the weed, all of said soil-working devices being of the same size;

(e) means for adjustably mounting the height of said bar with respect to the axis of the wheels so as to vary the working depth of said soil-working devices;

(f) two longitudinally-spaced transverse beams secured to and extending below said tool bar, and a plurality of vertical longitudinal plates secured to said transverse beams and extending transverse to said tool bar, on each side of said central pair of soil-working devices and on each side of each of said outermost soil-working devices, for confining earth and weeds displaced by said soil-working devices;

(g) a transverse vertical plate secured between adjacent vertical longitudinal plates at the back of said soil-working devices for levelling the soil after the passage of said soil-working devices;

(h) vertical rotary discs carried by one of said transverse beams and each located ahead of, and in line with, one of said vertical longitudinal plates for cutting the soil ahead of the plates;

(i) means for coupling said shafts to the regular power take-off of the tractor, said means driving the shafts of said cental pair of devices in opposite direction; and (j) wherein the lower edge of said plates and of said rotary discs is substantially at the same level and slightly lower than the lowermost ends of said tines.

* * * * *